(12) United States Patent
Anderson

(10) Patent No.: US 7,472,546 B2
(45) Date of Patent: Jan. 6, 2009

(54) REGENERATIVE BRAKING SYSTEM FOR A WORK MACHINE

(75) Inventor: Eric Richard Anderson, Galena, IL (US)

(73) Assignee: Deere & Company, Moline, IL (US)

( * ) Notice: Subject to any disclaimer, the term of this patent is extended or adjusted under 35 U.S.C. 154(b) by 223 days.

(21) Appl. No.: 11/564,537

(22) Filed: Nov. 29, 2006

(65) Prior Publication Data

US 2007/0096555 A1    May 3, 2007

(51) Int. Cl.
*F15B 1/02*    (2006.01)
*B60K 6/00*    (2007.10)
(52) U.S. Cl. ............................ 60/414; 60/488
(58) Field of Classification Search ............... 60/413, 60/414, 422, 488; 303/152
See application file for complete search history.

(56) References Cited

U.S. PATENT DOCUMENTS

| | | | |
|---|---|---|---|
| 4,098,144 A * | 7/1978 | Besel et al. | 74/661 |
| 4,441,573 A * | 4/1984 | Carman et al. | 60/413 |
| 4,760,697 A * | 8/1988 | Heggie et al. | 60/408 |
| 6,739,127 B2 * | 5/2004 | Nippert et al. | 60/414 |

* cited by examiner

*Primary Examiner*—Thomas E Lazo
(74) *Attorney, Agent, or Firm*—Taylor & Aust, P.C.

(57) ABSTRACT

A regenerative braking system for a work machine includes a ground driven hydraulic pump coupled to a drive system, the ground driven hydraulic pump being configured to absorb shaft power from the drive system by converting the shaft power into a hydraulic flow, and the ground driven hydraulic pump also being configured to provide shaft power to the drive system by converting hydraulic flow into shaft power. The regenerative braking system also includes a hydraulic circuit fluidly coupling the ground driven hydraulic pump. The hydraulic circuit is configured to selectively receive and store energy from the drive system via the ground driven hydraulic pump; transmit the energy back to the drive system via the ground driven hydraulic pump; and direct hydraulic flow from the ground driven hydraulic pump to a hydraulic system of the work machine when an output of the main hydraulic pump drops below a desired level.

24 Claims, 3 Drawing Sheets

REGENERATIVE BRAKING SYSTEM FOR A WORK MACHINE

FIELD OF THE INVENTION

The present invention relates to work machines, and more particularly, to a regenerative braking system for a work machine.

BACKGROUND OF THE INVENTION

Work machines, such as wheel loaders, are employed to perform work, such as digging, lifting, and moving large objects, in the agricultural, construction, and forestry related industries. Each work machine is typically powered by engine, such as a diesel engine, which operates a hydraulic system, a steering system, and a transmission for use in moving to and from the work site, moving around the worksite, and in performing the tasks designated for the work machine.

It is becoming increasingly important to improve the fuel efficiency of work machines, and hence thereby reduce the cost of operating a work machine, as well as to reduce engine emissions from the work machine. However, the cost of additional systems to improve fuel efficiency and reduce emissions output may be prohibitive. It is therefore desirable to improve efficiency and reduce emissions using primarily components and subsystems already employed in the work machine.

SUMMARY OF THE INVENTION

The present invention provides a regenerative braking system for a work machine.

The invention, in one form thereof, is directed to a regenerative braking system for a work machine. The work machine has a drive system for driving the work machine, and a hydraulic system for operating the work machine, the hydraulic system powered by a main hydraulic pump. The regenerative braking system includes a ground driven hydraulic pump coupled to the drive system, the ground driven hydraulic pump being configured to absorb shaft power from the drive system by converting the shaft power into a hydraulic flow, and the hydraulic pump also being configured to provide shaft power to the drive system by converting hydraulic flow into shaft power. The regenerative braking system also includes a hydraulic circuit fluidly coupled to the ground driven hydraulic pump. The hydraulic circuit is configured to selectively receive and store energy from the drive system via the ground driven hydraulic pump; transmit the energy back to the drive system via the ground driven hydraulic pump; and direct hydraulic flow from the ground driven hydraulic pump to the hydraulic system when an output of the main hydraulic pump drops below a desired level.

The invention, in another form thereof, is directed to a work machine. The work machine includes an engine; a drive system powered by the engine for driving the work machine; a main hydraulic pump powered by the engine; a hydraulic system for operating the work machine, wherein the hydraulic system powered by the main hydraulic pump; and a regenerative braking system. The regenerative braking system includes a ground driven hydraulic pump coupled to the drive system, the ground driven hydraulic pump being configured to absorb shaft power from the drive system by converting the shaft power into a hydraulic flow, and the hydraulic pump also being configured to provide shaft power to the drive system by converting hydraulic flow into shaft power. The regenerative braking system also includes a hydraulic circuit fluidly coupled to the ground driven hydraulic pump. The hydraulic circuit is configured to selectively receive and store energy from the drive system via the ground driven hydraulic pump; transmit the energy back to the drive system via the ground driven hydraulic pump; and direct hydraulic flow from the ground driven hydraulic pump to the hydraulic system when an output of the main hydraulic pump drops below a desired level.

DETAILED DESCRIPTION OF THE INVENTION

Figure 1:
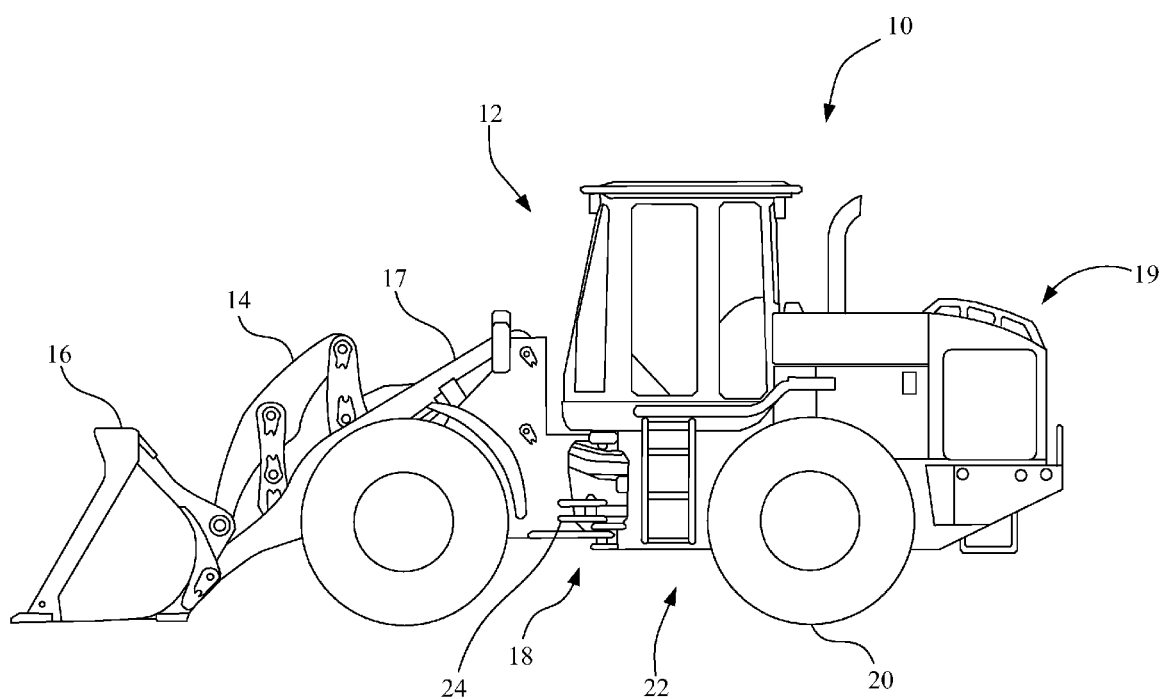
FIG. 1 depicts a work machine employed in accordance with an embodiment of the present invention.

Referring now to FIG. 1, there is shown a work machine 10 in accordance with an embodiment of the present invention. Work machine 10 may be used for performing work, such as agricultural, construction, and/or forestry work, and may be wheel driven and/or track driven. For example, work machine 10 may be a backhoe loader, a motor grader, an excavator or another machine used in the construction industry. In other examples, work machine 10 may be a feller buncher, a knuckleboom loader, a harvester, or another machine used in the forestry industry, or may be a tractor, a combine, or another agricultural machine. In the present embodiment, work machine 10 is an articulated wheel loader.

Work machine 10 includes a cab 12, a work system 14 for operating an attachment 16, a hydraulic system 18, a drive system 20, and a regenerative braking system 22. Cab 12 houses the operator of work machine 10 while operating work machine 10 and work system 14. Work system 14 is configured for operating attachment 16 via a boom 17. Attachment 16 is an interchangeable implement designed for performing particular tasks, and is coupled to boom 17. In the embodiment depicted in FIG. 1, attachment 16 is depicted as a bucket. However, it will be understood that attachment 16 may be any typical interchangeable attachment employed by a loader, such as bale forks, bale spears, pallet forks, a multifunction bucket, a round bale hugger, a debris grapple bucket, or a silage defacer.

Hydraulic system 18 includes a hydraulic steering system 24 for steering work machine 10. Hydraulic system 18 also powers work system 14 by providing hydraulic flow, e.g., to hydraulic cylinders (not shown) that actuate attachment 16 and hydraulic cylinders (not shown) that actuate boom 17, and powers a hydraulic fan drive 19 for driving a cooling fan to cool engine 26.

Figure 2:
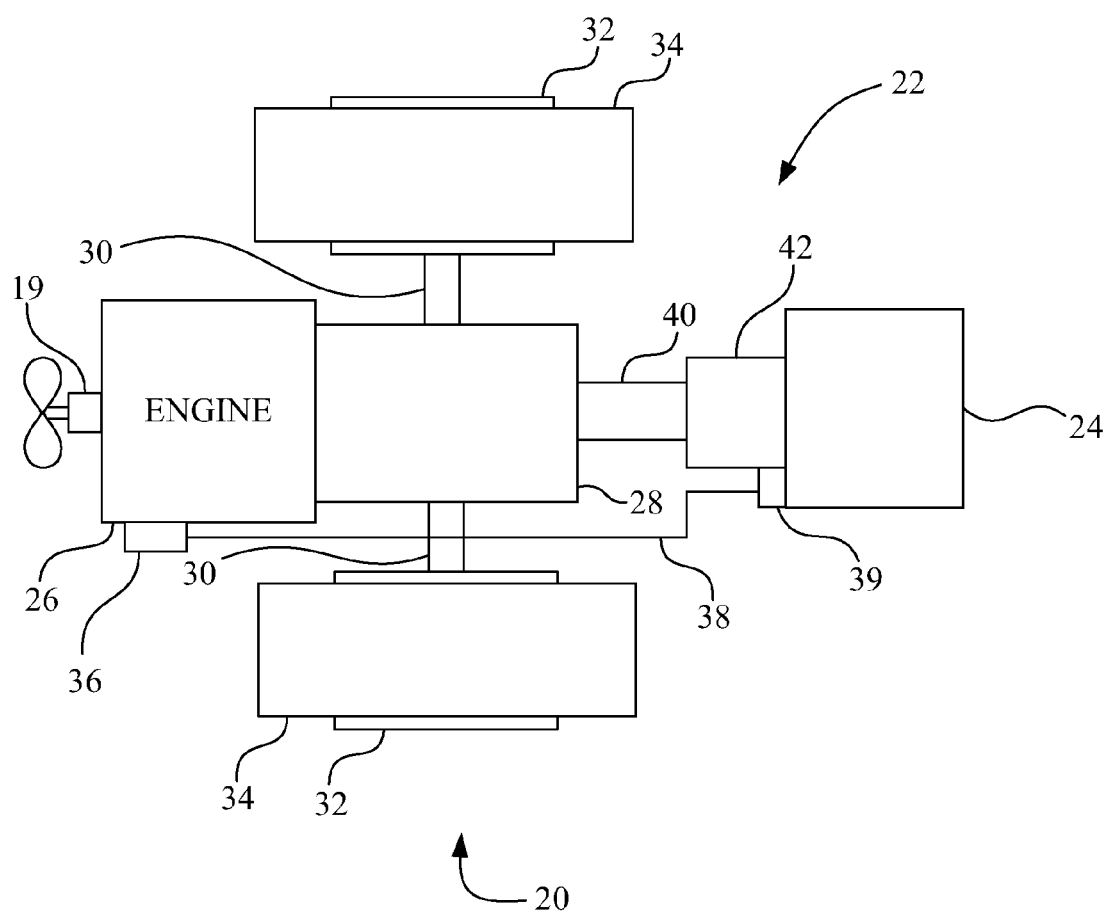
FIG. 2 is diagrammatic depiction of a regenerative braking system and a drive system in accordance with the embodiment of FIG. 1.

Referring now to FIG. 2, drive system 20 is powered by an engine 26, and includes a transmission 28, axles 30, wheels 32, and tires 34, and is configured for driving work machine 10, e.g., propelling work machine 10 to, from, and around a worksite. A main hydraulic pump 36, powered by engine 26, powers hydraulic system 18, including attachment 16, boom 17, fan drive 19, and hydraulic steering system 24, via hydraulic lines 38. Steering system 24 is controlled by a steering valve 39.

Regenerative braking system 22 includes a ground driven hydraulic pump 40 and a hydraulic circuit 42. Being ground driven, hydraulic pump 40 is not powered by engine 26, but rather, is powered by drive system 20 when work machine 10 is moving, i.e., if axles 30 are rotating, without regard to whether engine 26 is running.

In addition to being used as part of regenerative braking system 22, work machine 10 employs ground driven hydraulic pump 40 as a secondary steering pump, that is, a ground driven secondary steering pump. As a ground driven secondary steering pump, hydraulic pump 40 provides a backup hydraulic source to operate hydraulic steering system 24, e.g., in the event of a failure or inadvertent shutdown of key components that supply hydraulic power to hydraulic steering system 24, such as main hydraulic pump 36 and/or engine 26. Hence, hydraulic pump 40 has a dual use in the present embodiment—that is, as a secondary steering pump, and also as part of regenerative braking system 22. The dual use of hydraulic pump 40 in accordance with the present invention eliminates the need for a second pump for use with regenerative braking system 22, thus reducing the cost and complexity of adding regenerative braking to a particular work machine 10 design, as well as improving reliability and eliminating any parasitic loses associated with the addition of a second pump.

Ground driven hydraulic pump 40 is coupled to drive system 20, and is configured to absorb shaft power from drive system 20 by converting the shaft power into hydraulic flow. Hydraulic pump 40 is also configured to provide shaft power to drive system 20 by converting hydraulic flow into shaft power. Thus, movement of work machine 10 transmits power through drive system 20 into hydraulic pump 40, which converts that power into hydraulic flow. Conversely, by supplying hydraulic flow to hydraulic pump 40, movement may be imparted to work machine 10 via drive system 20. Accordingly, hydraulic pump 40 serves as both a pump and a motor in accordance with embodiments of the present invention.

Hydraulic circuit 42 is configured to selectively receive and store energy from drive system 20 via hydraulic pump 40, and to selectively transmit the energy back to drive system 20 via hydraulic pump 40. In addition, hydraulic circuit 42 is configured to selectively direct the hydraulic flow from ground driven hydraulic pump 40 to hydraulic system 18, particularly, hydraulic steering system 24, when the output of main hydraulic pump 36 drops below a desired level, e.g., due to a failure of main hydraulic pump 36 or an inadvertent shutdown of engine 26.

As used herein, the term, "selectively," pertains to the fact that hydraulic circuit 42 may be controlled to select one or more of the enumerated functions, that is, to receive and store energy from drive system 20, to transmit energy back to drive system 20, and to direct hydraulic flow from hydraulic pump 40 to hydraulic steering system 24. In the present embodiment, only one such function may be selected at any given time, although it will be understood that hydraulic circuit 42 may be configured to select more than one such function at any given time without departing from the scope of the present invention.

In order to perform a regenerative braking function, hydraulic circuit 42 is configured to selectively receive and store the energy from drive system 20 during braking of work machine 10, i.e., when the operator applies the brakes to slow or stop work machine 10. Hydraulic circuit is also configured to selectively transmit the energy back to drive system 20 during acceleration of work machine 10. That is, the stored energy is used to accelerate work machine 10 from a stop, or from a lower speed to a higher speed, either alone or in conjunction with power delivered to drive system 20 from engine 26.

Hydraulic pump 40 is bi-directional, i.e., rotating in one direction when work machine 10 is moving forward, and rotating in the opposite direction when work machine 10 moves in the reverse direction. Hydraulic circuit 42 is configured to selectively receive and store the energy from drive system 20 during either of forward and reverse movements of work machine 10, and is configured to selectively transmit the energy back to drive system during either of forward and reverse movements of work machine 10.

Figure 3:
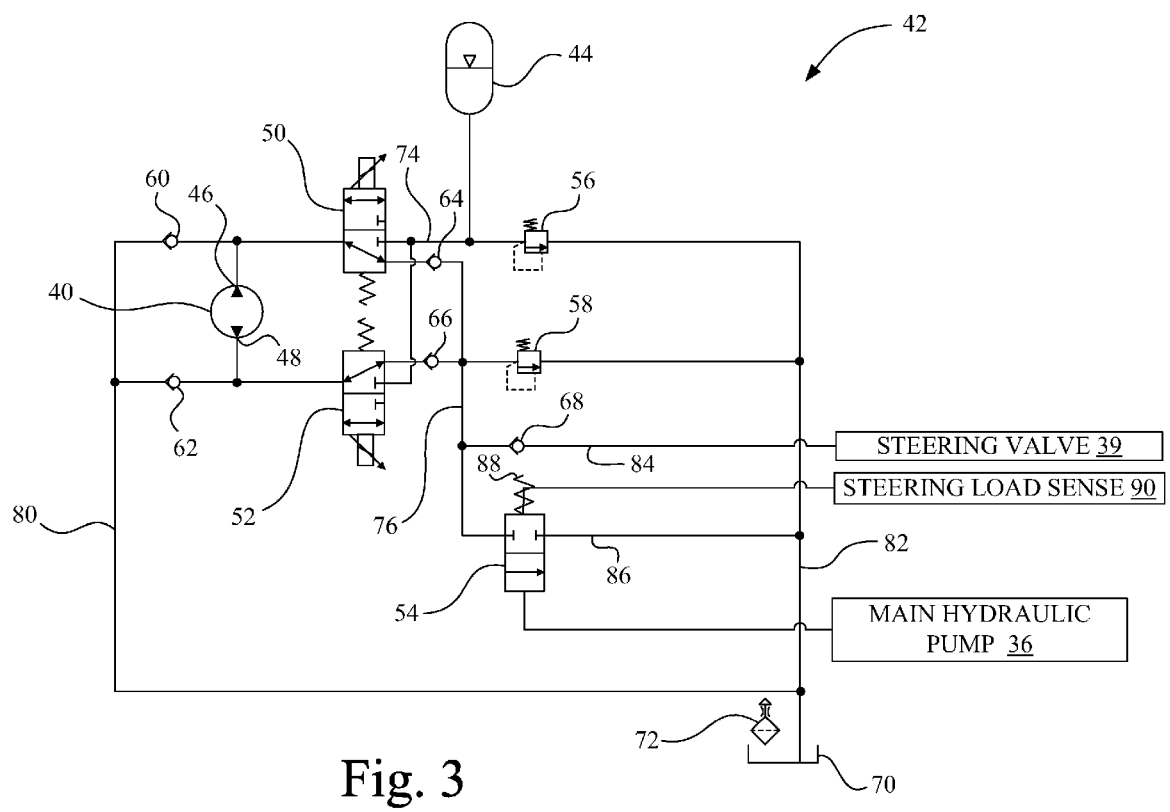
FIG. 3 depicts a schematic of a hydraulic circuit in accordance with the embodiment of FIG. 1.

Referring now to FIG. 3, hydraulic pump 40 includes two ports, port 46 and port 48, for receiving and discharging hydraulic flow. Hydraulic circuit 42 includes a hydraulic accumulator 44, a solenoid valve 50, a solenoid valve 52, a pilot operated solenoid valve 54, relief valves 56 and 58, and check valves 60, 62, 64, 66, and 68. Hydraulic circuit 42 drains into a reservoir 70 that is maintained at approximately atmospheric pressure by a breather 72.

Port 46 and port 48 are fluidly coupled to hydraulic circuit 42, in particular, to solenoid valve 50 and solenoid valve 52, respectively. Solenoid valves 50 and 52 are proportional two-position three-way valves. In their default positions, solenoid valves 50 and 52 direct hydraulic flow into common line 76, with back flow being prevented by check valves 64 and 66, respectively. Solenoid valves 50 and 52 are powered independently, and when powered, direct hydraulic flow into common line 74 for delivery to hydraulic accumulator 44.

A common line 74 fluidly couples solenoid valve 50 and solenoid valve 52 with hydraulic accumulator 44. Solenoid valve 50 is configured to regulate hydraulic flow as between port 46 and common line 74, and solenoid valve 52 is configured to regulate hydraulic flow as between port 48 and common line 74.

A common line 76 for providing hydraulic flow to hydraulic system 18 fluidly couples solenoid valve 50 and solenoid valve 52. Solenoid valve 50 is configured to regulate hydraulic flow as between port 46 and common line 76, and solenoid valve 52 is configured to regulate hydraulic flow as between port 48 and common line 76.

A supply line 80 fluidly couples inlet port 46 and inlet port 48 with reservoir 70 for supplying hydraulic fluid to hydraulic pump 40. Check valve 60, interposed between port 46 and supply line 80, prevents hydraulic flow from port 46 or solenoid valve 50 from back flowing into supply line 80. Check valve 62, interposed between port 48 and supply line 80, prevents hydraulic flow from port 48 or solenoid valve 50 from back flowing into supply line 80.

Relief valve 56 regulates the pressure at hydraulic accumulator 44 and common line 74, whereas relief valve 58 regulates the pressure at common line 76. If pressure in common line 74 exceeds a predetermined value, excess hydraulic flow is returned to reservoir 70 via relief valve 56 and a return line 82. Similarly, if pressure in common line 76 exceeds a predetermined value, excess hydraulic flow is returned to reservoir 70 via relief valve 58 and return line 82

Pilot operated solenoid valve 54 determines whether hydraulic flow from hydraulic pump 40 is directed to steering valve 39 via a hydraulic line 84 or to reservoir 70 via return line 82. Solenoid valve 54 is fluidly coupled between common line 76 and return line 82, via a hydraulic line 86, and is biased by a spring 88 to a default position in which hydraulic flow to return line 82 via hydraulic line 86 is prevented, forcing any hydraulic flow in common line 76 to flow through hydraulic line 84 to steering valve 39, hence, powering hydraulic steering system 24. Check valve 68 prevents back flow from steering valve 39 into common line 76.

Solenoid valve 54 remains in the default position as long as a steering load sense 90 pressure, which pertains to the hydraulic pressure demand in steering valve 39, in conjunction with the bias of spring 88, overcomes the pressure delivered by main hydraulic pump 36, such as where main hydraulic pump 36 has failed. During normal operation, main hydraulic pump 36 pressure is sufficient to drive solenoid valve 54 out of the default position, resulting in hydraulic flow from common line 76 draining to reservoir 70 via return line 82 during normal operation.

Hydraulic accumulator 44 is fluidly coupled to hydraulic circuit 42, and respectively stores and discharges energy from and to drive system 20 for regenerative braking. Accordingly, hydraulic circuit 42 is configured to selectively charge hydraulic accumulator 44 by directing hydraulic flow from ground driven hydraulic pump 40 to hydraulic accumulator 44 to thereby selectively receive and store energy from drive system 20, and to selectively discharge hydraulic accumulator 44 by directing hydraulic flow from hydraulic accumulator 44 to ground driven hydraulic pump 40 to thereby selectively transmit the energy back to drive system 20.

Port 46 and port 48 of hydraulic pump 40 respectively receive and discharge hydraulic flow when work machine 10 is moving in a forward direction, and respectively discharge and receive hydraulic flow when work machine 10 is moving in a reverse direction. As described herein, hydraulic circuit 42 is configured to selectively charge hydraulic accumulator 44 without regard to whether work machine is moving in the forward direction or the reverse direction; and is configured to selectively discharge hydraulic accumulator 44 without regard to whether work machine 10 is moving in the forward direction or the reverse direction.

For example, with work machine 10 moving in the forward direction, hydraulic flow is received from reservoir 70 by suction at port 46, and discharged at port 48. In order to charge hydraulic accumulator 44 during forward movement, solenoid valve 52 is powered, directing the hydraulic flow from port 48 to common line 74 and thus to hydraulic accumulator 44. At the same time, solenoid valve 50 is not powered, and hence remains in the default position. Check valve 64 prevents any hydraulic flow in common line 76 from entering port 46 via solenoid valve 50.

Conversely, with work machine 10 moving in the reverse direction, hydraulic flow is received from reservoir 70 by suction at port 48, and discharged at port 46. In order to charge hydraulic accumulator 44 during reverse movement, solenoid valve 50 is powered, directing the hydraulic flow from port 46 to common line 74 and thus to hydraulic accumulator 44. At the same time, solenoid valve 52 is not powered, and hence remains in the default position. Check valve 66 prevents any hydraulic flow in common line 76 from entering port 46 via solenoid valve 52.

Accordingly, hydraulic circuit 42 provides for charging hydraulic accumulator 44 without regard to whether work machine is moving in the forward direction or the reverse direction.

In order to move work machine 10 in the forward direction using regenerative braking system 22, solenoid valve 50 is powered, directing hydraulic flow from hydraulic accumulator 44 through common line 74 to port 46, which is converted to shaft power by hydraulic pump 40 to move work machine 10 forward. At the same time, solenoid valve 52 is not powered, and hence remains in the default position. The hydraulic flow discharged from port 48 is thus directed to common line 76.

Conversely, in order to move work machine 10 in the reverse direction using regenerative braking system 22, solenoid valve 52 is powered, directing hydraulic flow from hydraulic accumulator 44 through common line 74 to port 48, which is converted to shaft power by hydraulic pump 40 to move work machine 10 in reverse. At the same time, solenoid valve 50 is not powered, and hence remains in the default position. The hydraulic flow discharged from port 46 is thus directed to common line 76.

Accordingly, hydraulic circuit 42 provides for discharging hydraulic accumulator 44 without regard to whether work machine is moving in the forward direction or the reverse direction.

By charging hydraulic accumulator 44, energy is removed from drive system 20, slowing down work machine 10 when braking is desired. This energy may then be added back to drive system 20 when acceleration of work machine 10 is desired, reducing or eliminating the power demand, hence fuel demand, on engine 26 that would otherwise be required to achieve the same acceleration of work machine 10.

In addition, other embodiments of the present invention may take the energy stored in hydraulic accumulator 44 and transmit that energy in the form of hydraulic flow to operate components powered by hydraulic system 18, such as attachment 16, boom 17, and/or fan drive 19, thereby converting braking energy into a useful form for operating work machine 10, and reducing the power demand, hence fuel demand, on engine 26 that would otherwise be required to provide the power to main hydraulic pump 36 in order to operate such components powered by hydraulic system 18.

Having described the preferred embodiment, it will become apparent that various modifications can be made without departing from the scope of the invention as defined in the accompanying claims.

The invention claimed is:

1. A regenerative braking system for a work machine, said work machine having a drive system for driving said work machine and a hydraulic system for operating said work machine, said hydraulic system powered by a main hydraulic pump, said regenerative braking system comprising:
   a ground driven hydraulic pump coupled to said drive system, said ground driven hydraulic pump being configured to absorb shaft power from said drive system by converting said shaft power into a hydraulic flow, and said ground driven hydraulic pump also being configured to provide said shaft power to said drive system by converting said hydraulic flow into said shaft power; and
   a hydraulic circuit fluidly coupled to said ground driven hydraulic pump,
   wherein said hydraulic circuit is configured to selectively:
   receive and store an energy from said drive system via said ground driven hydraulic pump;
   transmit said energy back to said drive system via said ground driven hydraulic pump; and
   direct said hydraulic flow from said ground driven hydraulic pump to said hydraulic system when an output of said main hydraulic pump drops below a desired level.

2. The regenerative braking system of claim 1, wherein said hydraulic circuit is configured to said selectively receive and store said energy from said drive system during a braking of said work machine.

3. The regenerative braking system of claim 1, wherein said hydraulic circuit is configured to said selectively transmit said energy back to said drive system during an acceleration of said work machine.

4. The regenerative braking system of claim 1, wherein said hydraulic system includes a hydraulic steering system, and wherein said ground driven hydraulic pump is a ground driven secondary steering pump configured to provide backup hydraulic source to operate hydraulic steering system.

5. The regenerative braking system of claim 1, wherein:
said ground driven hydraulic pump is bi-directional,
said hydraulic circuit is configured to said selectively receive and store said energy from said drive system during either of forward and reverse movements of said work machine, and
said hydraulic circuit is configured to said selectively transmit said energy back to said drive system during said either of said forward and said reverse movements of said work machine.

6. The regenerative braking system of claim 1, said work machine having at least one component powered by said hydraulic system, wherein said hydraulic circuit is also configured to selectively transmit said energy in the form of said hydraulic flow to operate said at least one component.

7. The regenerative braking system of claim 6, wherein said at least one component is at least one of a boom, an attachment coupled to said boom, and a hydraulic fan drive.

8. The regenerative braking system of claim 1, further comprising:
a hydraulic accumulator fluidly coupled to said hydraulic circuit,
wherein said hydraulic circuit is configured to selectively:
charge said hydraulic accumulator by directing said hydraulic flow from said ground driven hydraulic pump to said hydraulic accumulator to thereby said selectively receive and store said energy from said drive system; and
discharge said hydraulic accumulator by directing said hydraulic flow from said hydraulic accumulator to said ground driven hydraulic pump to thereby said selectively transmit said energy back to said drive system.

9. The regenerative braking system of claim 8, said ground driven secondary pump having a first port and a second port which respectively receive and discharge said hydraulic flow when said work machine is moving in a forward direction, and which respectively discharge and receive said hydraulic flow when said work machine is moving in a reverse direction, said first port and said second port being fluidly coupled to said hydraulic circuit,
wherein said hydraulic circuit is configured to said selectively said charge said hydraulic accumulator without regard to whether said work machine is moving in said forward direction or said reverse direction; and
wherein said hydraulic circuit is configured to said selectively discharge said hydraulic accumulator without regard to whether said work machine is moving in said forward direction or said reverse direction.

10. The regenerative braking system of claim 9, said hydraulic circuit further including:
a first solenoid valve fluidly coupled to said first port;
a second solenoid valve fluidly coupled to said second port; and
a first common line fluidly coupling said first solenoid valve and said second solenoid valve with said hydraulic accumulator.

11. The regenerative braking system of claim 10, wherein said first solenoid valve is configured to regulate said hydraulic flow as between said first port and said first common line, and wherein said second solenoid valve is configured to regulate said hydraulic flow as between said second port and said first common line.

12. The regenerative braking system of claim 10, said hydraulic circuit further including a second common line for providing said hydraulic flow to said hydraulic system, said second common line fluidly coupling said first solenoid valve and said second solenoid valve, wherein said first solenoid valve is configured to regulate said hydraulic flow as between said first port and said second common line, and wherein said second solenoid valve is configured to regulate said hydraulic flow as between said second port and said second common line.

13. A work machine, comprising:
an engine;
a drive system powered by said engine for driving said work machine;
a main hydraulic pump powered by said engine;
a hydraulic system for operating said work machine, said hydraulic system powered by said main hydraulic pump; and
a regenerative braking system, said regenerative braking system including:
a ground driven hydraulic pump coupled to said drive system, said ground driven hydraulic pump being configured to absorb shaft power from said drive system by converting said shaft power into a hydraulic flow, and said ground driven hydraulic pump also being configured to provide said shaft power to said drive system by converting said hydraulic flow into said shaft power; and
a hydraulic circuit fluidly coupled to said ground driven hydraulic pump,
wherein said hydraulic circuit is configured to selectively:
receive and store an energy from said drive system via said ground driven hydraulic pump;
transmit said energy back to said drive system via said ground driven hydraulic pump; and
direct said hydraulic flow from said ground driven hydraulic pump to said hydraulic system when an output of said main hydraulic pump drops below a desired level.

14. The work machine of claim 13, wherein said hydraulic circuit is configured to said selectively receive and store said energy from said drive system during a braking of said work machine.

15. The work machine of claim 13, wherein said hydraulic circuit is configured to said selectively transmit said energy back to said drive system during an acceleration of said work machine.

16. The work machine of claim 13, wherein said hydraulic system includes a hydraulic steering system, and wherein said ground driven hydraulic pump is a ground driven secondary steering pump configured to provide backup hydraulic source to operate hydraulic steering system.

17. The work machine of claim 13, wherein:
said ground driven hydraulic pump is bi-directional,
said hydraulic circuit is configured to said selectively receive and store said energy from said drive system during either of forward and reverse movements of said work machine, and
said hydraulic circuit is configured to said selectively transmit said energy back to said drive system during said either of said forward and said reverse movements of said work machine.

18. The work machine of claim 13, further comprising at least one component powered by said hydraulic system, wherein said hydraulic circuit is also configured to selectively transmit said energy in the form of said hydraulic flow to operate said at least one component.

19. The work machine of claim 18, wherein said at least one component is at least one of a boom, an attachment coupled to said boom, and a hydraulic fan drive.

20. The work machine of claim 13, said regenerative braking system further including:

a hydraulic accumulator fluidly coupled to said hydraulic circuit, wherein said hydraulic circuit is configured to selectively:

charge said hydraulic accumulator by directing said hydraulic flow from said ground driven hydraulic pump to said hydraulic accumulator to thereby said selectively receive and store said energy from said drive system; and discharge said hydraulic accumulator by directing said hydraulic flow from said hydraulic accumulator to said ground driven hydraulic pump to thereby said selectively transmit said energy back to said drive system.

21. The work machine of claim 20, said ground driven secondary pump having a first port and a second port which respectively receive and discharge said hydraulic flow when said work machine is moving in a forward direction, and which respectively discharge and receive said hydraulic flow when said work machine is moving in a reverse direction, said first port and said second port being fluidly coupled to said hydraulic circuit, wherein said hydraulic circuit is configured to said selectively said charge said hydraulic accumulator without regard to whether said work machine is moving in said forward direction or said reverse direction; and wherein said hydraulic circuit is configured to said selectively discharge said hydraulic accumulator without regard to whether said work machine is moving in said forward direction or said reverse direction.

22. The work machine of claim 21, said hydraulic circuit further including:

a first solenoid valve fluidly coupled to said first port;

a second solenoid valve fluidly coupled to said second port; and a first common line fluidly coupling said first solenoid valve and said second solenoid valve with said hydraulic accumulator.

23. The work machine of claim 22, wherein said first solenoid valve is configured to regulate said hydraulic flow as between said first port and said first common line, and wherein said second solenoid valve is configured to regulate said hydraulic flow as between said second port and said first common line.

24. The work machine of claim 22, said hydraulic circuit further including a second common line for providing said hydraulic flow to said hydraulic system, said second common line fluidly coupling said first solenoid valve and said second solenoid valve, wherein said first solenoid valve is configured to regulate said hydraulic flow as between said first port and said second common line, and wherein said second solenoid valve is configured to regulate said hydraulic flow as between said second port and said second common line.

* * * * *